US006970311B2

(12) United States Patent
Jaquette

(10) Patent No.: US 6,970,311 B2
(45) Date of Patent: Nov. 29, 2005

(54) STORING DATA TO MAGNETIC TAPE BOTH TO ONE SET OF TRACKS AND IN THE SAME OPERATION REWRITTEN TO ANOTHER SET OF TRACKS

(75) Inventor: Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 10/642,982

(22) Filed: Aug. 18, 2003

(65) Prior Publication Data

US 2005/0041317 A1    Feb. 24, 2005

(51) Int. Cl.⁷ .............................................. G11B 5/09
(52) U.S. Cl. .............................. 360/46; 360/63; 360/48
(58) Field of Search ............................. 360/48, 31, 46, 360/29, 63

(56) References Cited

U.S. PATENT DOCUMENTS

| | | | |
|---|---|---|---|
| 4,410,942 A | 10/1983 | Milligan et al. | 364/200 |
| 4,435,762 A | 3/1984 | Milligan et al. | 364/200 |
| 4,534,013 A | 8/1985 | Sheth | 364/900 |
| 4,675,807 A | 6/1987 | Gourneau et al. | 364/200 |
| 4,982,390 A | 1/1991 | Tanaka | 369/30 |
| 5,200,864 A | 4/1993 | Dunn et al. | 360/48 |
| 5,341,378 A | 8/1994 | Shih | 371/2.2 |
| 5,485,321 A | 1/1996 | Leonhardt et al. | 360/48 |
| 5,572,378 A | 11/1996 | Schwarz et al. | 360/48 |
| 5,715,104 A | 2/1998 | Takada et al. | 360/15 |
| 5,995,306 A * | 11/1999 | Contreras et al. | 360/31 |
| 6,016,233 A | 1/2000 | Scholz et al. | 360/15 |
| 6,147,823 A | 11/2000 | Matsumi et al. | 360/8 |
| 6,154,334 A | 11/2000 | Pine | 360/74.1 |

* cited by examiner

*Primary Examiner*—David Hudspeth
*Assistant Examiner*—Daniell L. Negrón
(74) *Attorney, Agent, or Firm*—John H. Holcombe

(57) ABSTRACT

A recording system of a magnetic tape drive is operated to cause one separate set of write heads to write data discontinuously to magnetic tape as received, and to save the data, and, during the same operation, to cause another separate set of write heads to rewrite data to magnetic tape in a continuous arrangement. The writing may be in parallel and simultaneous. Thus, during the same operation, and at the same time, the separate sets of the plurality of write heads, temporarily write the received data to magnetic tape so that the sender can erase its copy, and rewrite the saved data to the magnetic tape in a permanent arrangement, without waiting to complete first writing received data, to complete subsequently rewriting the data, and repeating.

20 Claims, 8 Drawing Sheets

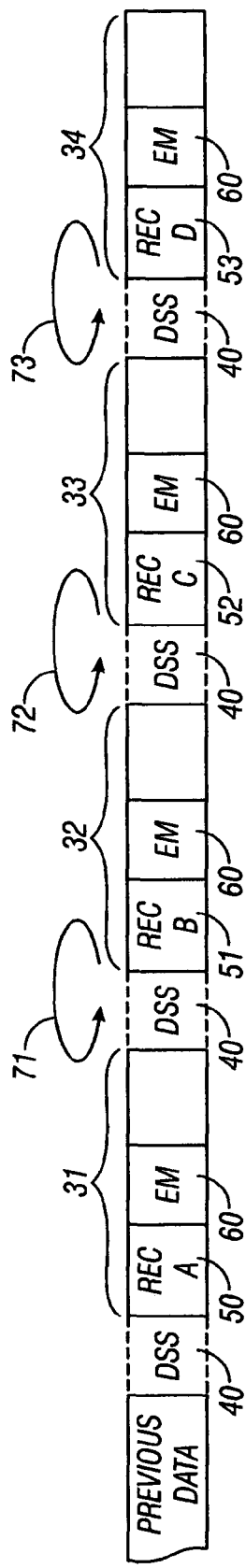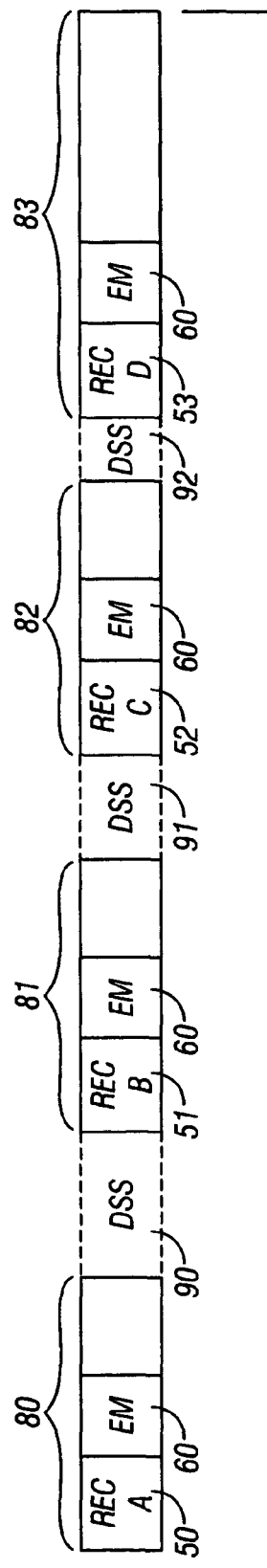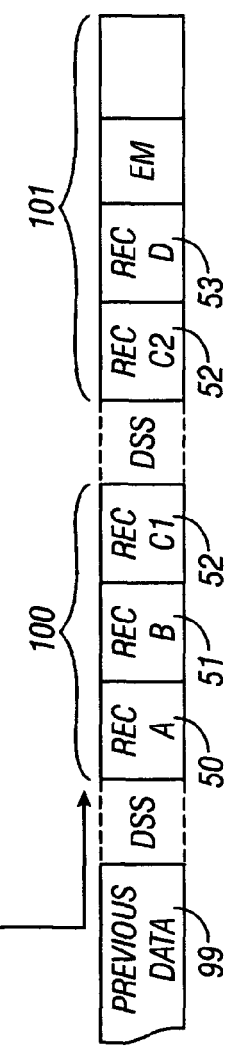
FIG. 2 *(Prior Art)*
FIG. 3 *(Prior Art)*

PASS 1 {
| 0A | BF WRITTEN DATA 0 | ←—245 |
|----|----|----|
| 1A | (ALTERNATE BF WRITTEN DATA) | ←—246 |
| 2A | UNWRITTEN | ←—247 |
| 3A | UNWRITTEN | ←—248 |
| 0B | REWRITTEN DATA 0 | ←—240 |
| 1B | UNWRITTEN | ←—241 |
| 2B | UNWRITTEN | ←—242 |
| 3B | UNWRITTEN | ←—243 |
}

FIG. 8A

PASS 2 {
| 0A | BF WRITTEN DATA 0 | ←—245 |
|----|----|----|
| 1A | BF WRITTEN DATA 1 | ←—246 |
| 2A | UNWRITTEN | ←—247 |
| 3A | UNWRITTEN | ←—248 |
| 0B | REWRITTEN DATA 0 | ←—240 |
| 1B | REWRITTEN DATA 1 | ←—241 |
| 2B | UNWRITTEN | ←—242 |
| 3B | UNWRITTEN | ←—243 |
}

FIG. 8B

PASS 1 {
| 250→ | 0A | FULL HEAD WRITTEN DATA 0 |
|----|----|----|
| | 1A | UNWRITTEN |
| | 2A | UNWRITTEN |
| | 3A | UNWRITTEN |
| | 4A | UNWRITTEN |
| 251→ | 0B | FULL HEAD WRITTEN DATA 0 |
| | 1B | UNWRITTEN |
| | 2B | UNWRITTEN |
| | 3B | UNWRITTEN |
| | 4B | UNWRITTEN |
}

FIG. 9

PASS 1
| 270 → 0 | REWRITTEN DATA 0 |
| 271 → 1 | BF WRITTEN DATA 0 |
| 272 → 2 | (ALTERNATE BF WRITTEN DATA) |
| 3 | UNWRITTEN |
| 4 | UNWRITTEN |

*FIG. 10A*

PASS 2
| 270' → 0 | REWRITTEN DATA 0 |
| 271' → 1 | REWRITTEN DATA 1 |
| 272' → 2 | BF WRITTEN DATA 1 |
| 273 → 3 | (ALTERNATE BF WRITTEN DATA) |
| 4 | UNWRITTEN |

*FIG. 10B*

STORING DATA TO MAGNETIC TAPE BOTH TO ONE SET OF TRACKS AND IN THE SAME OPERATION REWRITTEN TO ANOTHER SET OF TRACKS

DOCUMENT INCORPORATED BY REFERENCE

Coassigned U.S. patent application Ser. No. 10/058,101 is incorporated for its showing of the initial writing of data to magnetic tape, accumulating that data and subsequently recursively writing the accumulated data to the magnetic tape in a sequence.

FIELD OF THE INVENTION

This invention relates to storage of data to magnetic tape, and, more particularly, to storage of data which is to be physically written to tape before a command complete response can be made, so that the entity sending the data is able to erase its data, knowing that a copy physically exists on magnetic tape.

BACKGROUND OF THE INVENTION

Magnetic tape provides a means for physically storing data which may be archived or which may be stored in storage shelves of automated data storage libraries and accessed when required. Data stored in this manner has an aspect of permanence which allows copies of the data stored in memory or disk at a host system to be erased, knowing that a copy exists on magnetic tape. The available storage space at the host system is relatively expensive, and there is a desire to release the storage space as soon as possible. Hence, data is typically transferred through an intermediate staging buffer, such as a hard disk, to the tape drive, and there is also a desire to release and overwrite the staging buffer as soon as possible.

Thus, it is often desirable to "synchronize" the data.

"Synchronized data" is defined as data or other information which is subject to a "synchronizing event" or similar command requiring the tape drive to not return "Command Complete" to a write type of command, or an indication that the command has been or will be successfully executed, until it has actually committed the data to media, specifically, the magnetic tape. As the result, if power is lost, the data can be recovered from the tape, whereas it may not be recoverable from a volatile DRAM storage of the tape drive buffer.

One example of a synchronizing event is a Write Filemark command with the Immediate bit set to "0". This means that the drive is not to respond immediately, but instead is to respond when the command has completed, meaning that any data sent as part of the command is written out to tape. A specialized case of a Write Filemark command is where the number of Filemarks field is also set to "0", meaning that the Write Filemark command has no data of its own, and thus the sole purpose of the command is to assure that all data which precedes the command must be written to tape before a command complete is sent. Hence, this command is often referred to as a "Synchronize" command, as is known to those of skill in the art.

Another example of a synchronizing event is a host selectable write mode known to those of skill in the art as "non-buffered writes", where an implicit synchronize must be performed after each record is written from the host. "Command Complete" is not returned for any write command until the data is successfully written on media.

Herein, writing any data record, group of records, or other mark, is defined as a "transaction", and writing such data record, etc., as the result of a synchronizing event is defined as a "synchronized transaction".

A difficulty with respect to magnetic tape is that the data is recorded sequentially without long gaps between data sets, whereas synchronized transactions are stored in separate bursts for each synchronizing event, with a noticeable time period before writing the next transaction. This requires that the tape drive "backhitch" after writing the synchronized transaction in order to write the next transaction closely following the preceding transaction. Tape is written or read while it is moved longitudinally at a constant speed. Hence, a backhitch requires that the tape be stopped, reversed to beyond the end of the previous transaction, stopped again, and accelerated up to speed in the original direction by the time that the end of the previous transaction is reached. As is understood by those of skill in the art, the backhitch process consumes a considerable amount of time, and, if a large number of small synchronized transactions are to be stored, the throughput of the tape drive is reduced dramatically. As an example, backhitch times can vary from about half a second to over three seconds.

The incorporated '101 Application solves the problem by writing synchronized data transactions to magnetic tape without stopping the tape, perhaps leaving gaps between the transactions, accumulates the synchronized transactions in a buffer, and subsequently rewrites the accumulated transactions from the buffer to the magnetic tape in a sequence. This is now called "Recursive Accumulating Backhitchless Flush", or "RABF", in the art. With large sized transactions relative to buffer size, it is possible that the buffer will fill with the accumulated transactions relatively quickly, forcing the recursive writing of the transactions and holding off the receipt of additional data during the recursive writing, such that non-RABF performance will approach that of RABF recording.

SUMMARY OF THE INVENTION

The present invention comprises a recording system, a magnetic tape drive, a method, a computer program product, and control logic for writing data to magnetic tape.

A recording system of a magnetic tape drive is operated so as to cause one separate set of write heads to write data to magnetic tape, and, during the same operation, to cause another separate set of write heads to rewrite data to magnetic tape. The writing may be in parallel and may be simultaneous.

In one embodiment, having at least one buffer and a recording system, a controller of the recording system operates the buffer(s) and the recording system to provide data from the buffer(s) to cause a separate set of the plurality of write heads to write the provided data to tracks of magnetic tape; and the controller saves the provided data at the buffer(s). During the same operation, the controller operates the buffer(s) and the recording system to provide saved data from the buffer(s) to cause another separate set of the plurality of write heads to rewrite the saved data to other tracks of the magnetic tape in a continuous arrangement. Thus, during the same operation, the separate sets of write heads, write data to magnetic tape, and rewrite saved data to the magnetic tape, perhaps simultaneously writing with the separate sets of write heads.

In a further embodiment, wherein the data is in the form of data transactions, the controller additionally responds to an indication that the data transactions are to be written to magnetic tape as synchronized data transactions, and operates the buffer(s) and the recording system to cause a separate set of the write heads to write the data transactions to tracks of magnetic tape in a manner which is discontinuous due to having to empty the buffer in response to synchronizing commands, and saves the data transactions at the buffer(s). During the same operation, the controller operates the buffer(s) and the recording system to cause another separate set of the plurality of write heads to rewrite saved data transactions to other tracks of the magnetic tape in a continuous arrangement.

In a still further embodiment, the controller additionally operates the recording system to cause the separate set of the plurality of write heads to write separator signals between the discontinuously written data transactions.

In another embodiment, the controller additionally, for each synchronized data transaction, returns a command complete at an interface upon completion of the writing a synchronized transaction to tracks of magnetic tape in a discontinuous manner.

In a further embodiment, wherein the magnetic tape drive additionally comprises a wrap control for translating the plurality of write heads laterally to different sets of wraps of the tracks of magnetic tape, such that either of the sets of write heads may write data to at least some of the wraps; the controller operates the wrap control, the buffer(s) and the recording system to write data from the buffer(s) to one of the wraps, the data to be saved, and to rewrite saved data on another wrap, potentially simultaneously; and to seek to an alternate wrap to continue to write the provided data to be saved, and to seek back to the one wrap and the another wrap. The rewriting of saved data can then continue at the another wrap as does the writing of the provided data at the one wrap.

In a still further embodiment, the wraps are accessed in a sequence, such that a wrap having the data to be saved follows in the sequence a wrap at which the data is rewritten, such that a continuous string of wraps are first written with the data to be saved, and then are overwritten with the rewritten data.

In another embodiment, wherein the magnetic tape drive additionally comprises a plurality of read heads for reading from magnetic tape while the magnetic tape is moved longitudinally with respect to the plurality of read heads, and a read data system, the controller additionally operates the read data system to read one of the wraps at a time with one set of the plurality of read heads.

In another embodiment, wherein the magnetic tape drive additionally comprises a wrap control for translating the plurality of write heads laterally to different wraps of the tracks of magnetic tape, the controller operates the wrap control, the buffer(s) and the recording system to write data from the buffer(s) to one of the wraps in a sequence of the wraps, and to rewrite the saved data to another of the wraps that is offset from the one of the wraps.

In a further embodiment, the controller selectively operates the buffer(s) and the recording system to provide data from the buffer(s) to cause a separate set of the plurality of write heads to write the provided data to tracks of magnetic tape, saving the provided data; and, during the same operation, operates the buffer(s) and the recording system to provide saved data from the buffer(s) to cause another separate set of the plurality of write heads to write the saved and provided data to other tracks of the magnetic tape; and selectively operates the buffer(s) and the recording system to provide data from the buffer(s) to cause the plurality of write heads to write provided data to tracks of magnetic tape, comprising up to all sets of the write heads.

In still another embodiment of the present invention, saved and discontinuously written data transactions may be temporarily rewritten while the discontinuous writing of data transactions continues, allowing the original discontinuously written transactions to be overwritten before the data transactions are finally rewritten.

In a still further embodiment, wherein the magnetic tape drive additionally comprises a plurality of read heads for reading from magnetic tape while the magnetic tape is moved longitudinally with respect to the plurality of read heads, the controller additionally selectively operates the read data system to read one of the wraps at a time with one set of the plurality of read heads; and selectively operates the read data system to read a plurality of the wraps at a time with the plurality of read heads.

For a fuller understanding of the present invention, reference should be made to the following detailed description taken in conjunction with the accompanying drawings.

BRIEF DESCRIPTION OF THE DRAWINGS

FIG. 2 is a diagrammatic illustration of synchronized data written on magnetic tape employing a prior art methodology with backhitches;

FIG. 3 is a diagrammatic illustration of synchronized data written on magnetic tape employing a prior art backhitchless flush and recursive write methodology;

FIGS. 8A and 8B are diagrammatic illustrations of wraps of a magnetic tape as data is written in accordance with the present invention;

FIG. 9 is a diagrammatic illustration of wraps of a magnetic tape as data is written in accordance with another aspect of the present invention;

FIGS. 10A and 10B are diagrammatic illustrations of wraps of a magnetic tape as data is written in accordance with another embodiment of the present invention.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
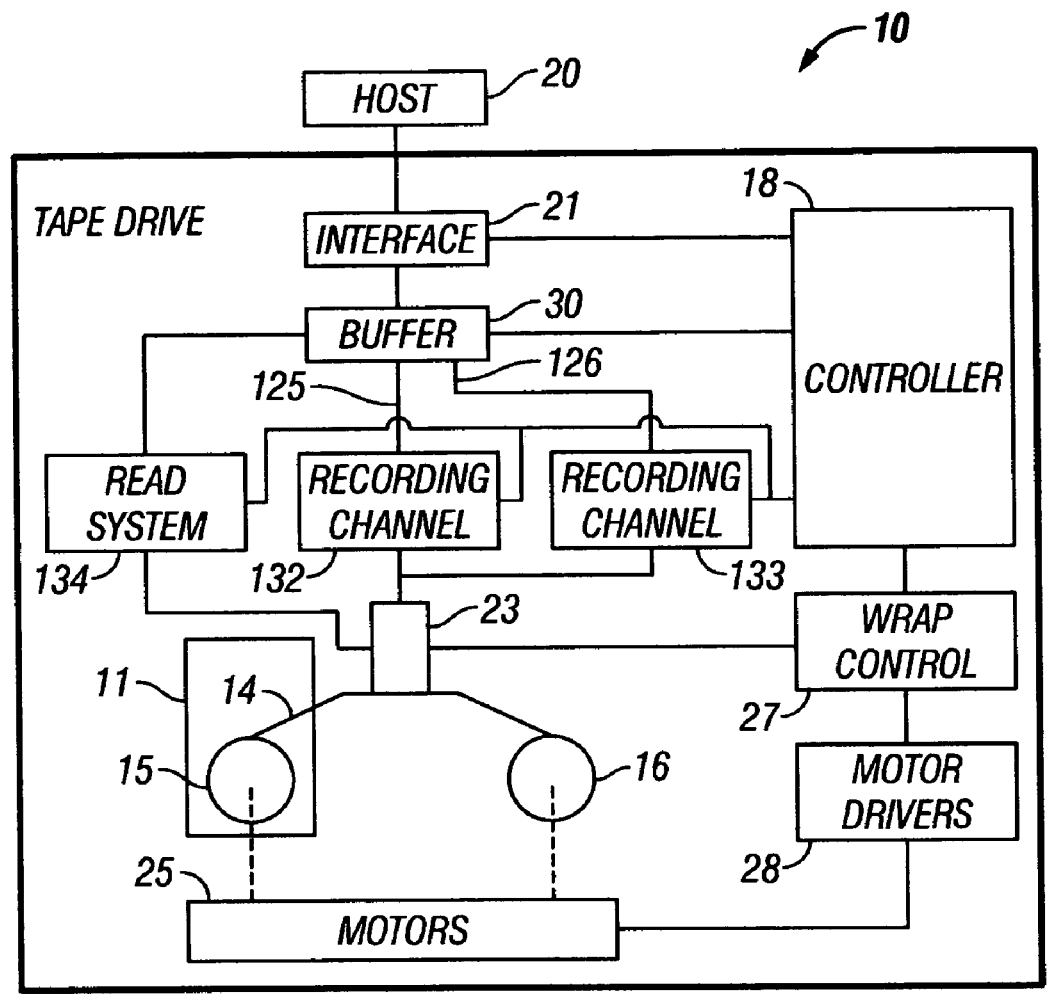
FIG. 1 is a block diagram of magnetic tape drive with a magnetic tape cartridge, which tape drive implements the present invention.

Referring to FIG. 1, a tape drive 10 is illustrated which may implement the present invention. The tape drive provides a means for reading and writing information with respect to a magnetic tape cartridge 11. A cartridge and associated tape drive are illustrated, such as those adhering to the Linear Tape Open (LTO) format. An example of a single reel tape drive is the IBM 3580 Ultrium magnetic tape drive based on LTO technology. A further example of a single reel tape drive and cartridge is such as that discussed in U.S. Pat. No. 5,432,652, Comeaux et al., issued Jul. 11, 1995. Another example of a single reel tape drive is the IBM 3590 Magstar magnetic tape drive and associated magnetic tape cartridge. An example of a dual reel cartridge is the IBM 3570 magnetic tape cartridge and associated drive.

As is understood by those of skill in the art, a magnetic tape cartridge 11 comprises a length of magnetic tape 14 wound on one or two reels 15, 16. Also as is understood by those of skill in the art, a tape drive 10 comprises one or more controllers 18 for operating the tape drive in accordance with commands received from a host system 20 received at an interface 21. The tape drive may comprise a standalone unit or comprise a part of a tape library or other subsystem. The tape drive 10 may be coupled to the host system 20 directly, through a library, or over a network, and employ the Small Computer Systems Interface (SCSI), Fibre Channel Interface, etc.

The magnetic tape cartridge 11 may be inserted in the tape drive 10, and loaded by the tape drive so that one or more tape heads 23 reads and/or writes information with respect to the magnetic tape 14 as the tape is moved longitudinally by one or more motors 25. The magnetic tape comprises a plurality of parallel tracks, or groups of tracks. In some formats, such as the LTO format, above, the tracks are arranged in a serpentine back and forth pattern of separate wraps, as is known to those of skill in the art. Also as known to those of skill in the art, a wrap control system 27 electronically switches to another set of read and/or write heads, and/or seeks and moves the read and/or write heads 23 laterally of the magnetic tape, to position the heads at a desired wrap or wraps, and, in some embodiments, track follows the desired wrap or wraps. The wrap control system may also control the operation of the motors 25 through motor drivers 28, both in response to instructions by the controller 18.

Controller 18 also provides the data flow and formatting of data to be read from and written to the magnetic tape, in accordance with the present invention, employing a buffer 30 having a plurality of separate data flow outputs 125, 126, and, employing a recording system having multiple recording channels 132 and 133, and a read data system 134 having multiple read channels. The terminology "recording channel" and "read channel" is employed herein to respectively provide data to or to read data from a set of write heads and/or read heads to write and/or read in parallel. A plurality of recording channel circuits and logic and read channel circuits and logic may comprise a recording channel and a read channel, respectively.

As discussed above, magnetic tape provides a means for physically storing data which may be archived or which may be stored in storage shelves of automated data storage libraries and accessed when required. Tape drives often employ a "read after write" process to insure that the data is written correctly to provide an aspect of permanence. This permanence allows copies of the data stored in memory or disk at the host system 20 to be erased, knowing that a correct, or at least correctable with ECC with margin, copy exists on magnetic tape.

The available storage space at the host system is relatively expensive, and there is a desire to release the storage space as soon as possible. Hence, data is typically transferred through an intermediate staging buffer, such as a hard disk, to the tape drive, and there is also a desire to release and overwrite the staging buffer as soon as possible. In the instant example, the staging buffer, if any, is considered to comprise part of the host system 20.

In order to release the staging buffer, it is necessary to have an assurance that the data has actually been recorded on the magnetic tape 14, and is not just in a volatile DRAM storage, such as buffer 30, when it may be lost if power to the buffer or to the drive is lost. Thus, it is often desirable to "synchronize" the data, requiring the tape drive to not return "Command Complete" to a write type of command, or an indication that the command has been or will be successfully executed, until it has actually committed the data to media, specifically, the magnetic tape 14. Once the data has been written to the magnetic tape, if power is lost, the data can be recovered from the tape, whereas it may not be recoverable from a volatile DRAM storage of the tape drive buffer.

Various examples of synchronizing events which have the effect of synchronizing the data are known to those of skill in the art. One example of a synchronizing event is a Write Filemark command with the Immediate bit set to "0". This means that the drive is not to respond immediately, but instead is to respond when the command has completed, meaning that any data sent as part of the command is written out to tape. A specialized case of a Write Filemark command is where the number of Filemarks field is also set to "0", meaning that the Write Filemark command has no data of its own, and the only meaning of the command is that all data which precedes the command must be written to tape before a command complete is sent. Another example is a host selected non-buffered write mode implicitly requiring a synchronize for each record.

Referring to FIG. 2, data is typically recorded on magnetic tape sequentially with only short gaps 40 between data sets, for example between data sets 31 and 32, 32 and 33, etc. These gaps may be written with an Interblock Gap (IBG) pattern, or may comprise a Data Set Separator (DSS) pattern 40, as is known to those of skill in the art. The gap may comprise an actual unrecorded portion and a portion that is recorded. For example, the LTO format DSS comprises a tone pattern between data sets. As discussed above, the tape is written or read while motors 25 of FIG. 1 move the tape longitudinally. Data typically comprises a string of records arranged in data sets, each with a DSS, which are written with nominal spacing. Only occasionally, typically when the buffer is empty, is the tape stopped.

However, if the data is synchronized, it must be immediately written to tape from the buffer, and only after the synchronized transaction has been written to tape is the transaction erased from the buffer and overwritten, such that it cannot be the subject of a continuous data flow. Hence, synchronized transactions instead must be written immediately in separate bursts for each synchronization event. As the result, after one data set is written for a synchronized transaction, in the prior art of FIG. 2, to insure that the data sets are closely spaced, the controller 18 of FIG. 1 typically operates the servo system and motor drivers to stop the tape after the data set. Some finite distance and finite time is required to stop the tape, and the tape is then "backhitched", reversed to beyond the end of the previous data set, stopped again, and accelerated up to speed in the original direction by the time that the end of the first data set is reached, so that the DSS and the next data set may be written. As is understood by those of skill in the art, the backhitch process consumes a considerable amount of time.

As discussed above, if a large number of synchronized transactions are to be stored, the throughput of the tape drive is reduced dramatically.

In the example of FIG. 2, records 50–53 are synchronized. A transaction may comprise hundreds of records, but only transactions of one record each are illustrated for descriptive purposes herein. If a transaction comprised of a record, or group of records, ends in the middle of a data set, then an End Marker (EM) is written to signal that the remainder of that data set is empty. Synchronized transactions often can be multiple data sets in size, but are shown, for the purpose of illustration, as separate data sets, and are illustrated in FIG. 2 as data records 50–53 in data sets 31–34. Thus, the prior art process requires that the tape drive 10 backhitch (shown by arrow 71) after writing data set 31 (to synchronize transaction record 50), to be positioned to write data set 32 with a minimum amount of DSS pattern in between; to backhitch 72 after writing data set 32 to synchronize transaction record 51, and write data set 33; etc. The process continues until all of the synchronized data has been written.

FIG. 3 illustrates the "Recursive Accumulating Backhitchless Flush", or "RABF", approach of the incorporated '011 Application, which solves the problem by writing synchronized data transactions to magnetic tape without stopping the tape, perhaps leaving gaps between the transactions, accumulates the synchronized transactions in a buffer, and subsequently rewrites the accumulated transactions from the buffer to the magnetic tape in a sequence. This approach reduces the number of backhitches for the synchronized data.

In one example, the controller detects synchronized received transaction record 50 of FIG. 3 stored in the buffer; writes the detected synchronized transaction record 50, with EM 60, from the buffer to the magnetic tape as data set 80; leaves an elongated gap, comprising an unrecorded gap and/or written separator signals 90 (e.g., DSS) to the magnetic tape following the written synchronized transaction record 50 (data set 80), continuing the gap with or without separator signals 90 until a subsequently received synchronized transaction 51 (data set 81) is written to the magnetic tape following the separator signals; and repeats the detection of a synchronized received transaction (e.g., record 51), writing the detected synchronized transaction (as data set 81), and writing the gap of separator signals (e.g., separator signals 91), etc., for each succeeding detected synchronized received transaction, such that the tape is moved longitudinally during the repeated writing without stopping. Thus, there is no backhitch, the tape drive continues to write the synchronized transactions without stopping.

To complete the example of FIG. 3 for the four illustrated synchronized transaction records 50–53, the next synchronized received transaction 52 is detected, and is written as data set 82, and the gap separator signals (e.g., separator signals 92) are typically written for some or all of the distance until the next detected synchronized received transaction 53 is written as data set 83, etc.

Thus, no backhitch is required, saving considerable processing time for completing the process for writing all of the synchronized data.

Then, in a further example, also illustrated by FIG. 3, space on the magnetic tape is saved by recursively writing the synchronized data to separate wraps. To preserve the synchronized transactions 50–53 in the event that power is lost, the data sets 80–83 are considered as work copies of the transactions. Once the transactions have been recursively written, the work copies are abandoned and may be overwritten.

First, the controller detects a pattern of synchronized transactions to be written to the magnetic tape. A pattern may comprise a predetermined number of consecutive synchronized transactions of less than a certain length. As one example, a pattern may comprise two consecutive synchronized transactions, each having a length less than some number of data sets. As discussed above, the typical synchronized transaction is written to tape, and then the transaction is erased from the host system with the assurance that the transaction has been written to tape and will not be lost as the result of a power loss.

The controller writes each detected synchronized transaction, illustrated as a record 50–53, of the detected pattern from the buffer to the magnetic tape, e.g., as data sets 80–83, above. Previous synchronized transactions of the detected pattern may be excluded, having already been written in the manner discussed above before the pattern is detected. Thus, in FIG. 3, the previous synchronized transactions may comprise the previous data 99. Upon writing each synchronized transaction of the detected pattern from the buffer to the magnetic tape, the controller accumulates the synchronized transaction in the buffer; and subsequently recursively writes the accumulated transactions from the buffer to the magnetic tape in a sequence, e.g., illustrated as data sets 100, 101. The recursive writing may comprise a backhitch to place the recursively written accumulated transactions following the preceding data 99, and with the nominal gap.

Thus, the synchronized transactions 50–53 have been immediately written to the magnetic tape, and preserved against a power loss at the buffer, as work copies in data sets 80–83, while also being accumulated in the buffer, and then recursively written to immediately follow the preceding data 99 in data sets 100,101, saving space. Once the transactions have been recursively written, meaning that the data has been rewritten, the work copies 80–83 may be overwritten.

The point at which the accumulated synchronized data is recursively written may comprise the termination of the pattern of synchronously written transactions, may comprise a predetermined threshold, such as the limit of capacity of the buffer to accumulate data records, or may comprise the limit of capacity of the work space for the work copies 80–83 and their separator signals 90–92.

As discussed above, with large sized transactions, it is possible that the buffer will fill with the accumulated transactions relatively quickly, forcing the recursive writing of the transactions and holding off the receipt of additional data during the recursive writing, such that non-RABF performance will approach that of RABF recording.

Figure 4:
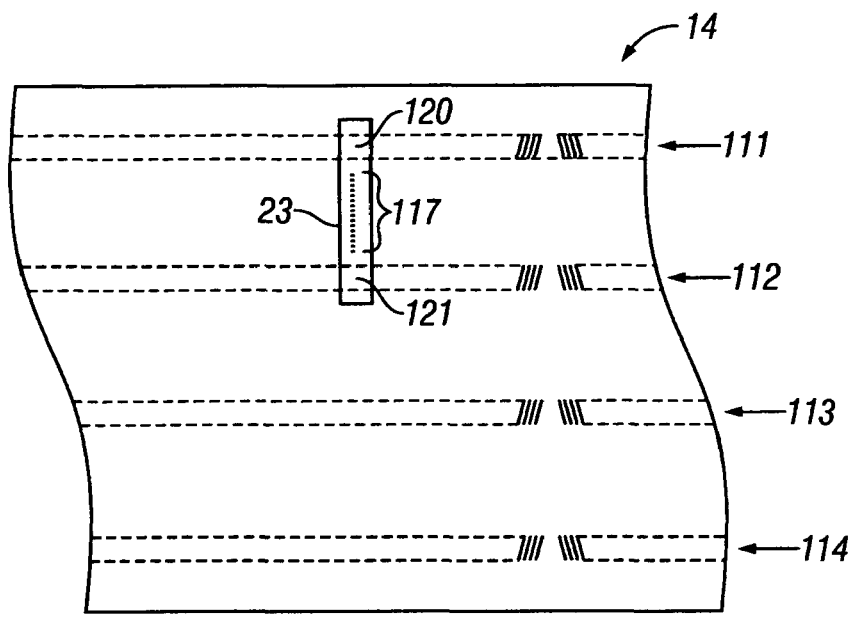
FIG. 4 is a schematic representation of a tape head of the magnetic tape drive of FIG. 1 and a length of magnetic tape with a plurality of separate servo bands.

FIG. 4 illustrates a magnetic tape 14, the magnetic tape having a plurality of separate longitudinal servo bands 111, 112, 113 and 114, which are laterally positioned on the magnetic tape, and with data tracks positioned between the servo bands. The tape head 23 comprises a number of separately addressable data read and/or write heads 117, which read and/or write data with respect to a number of parallel data tracks, and is provided with a separate servo head, or servo heads 120, 121, which are offset from the data read and/or write heads 117, so as to track follow the servo track and allow the data read and/or write heads to be guided along the data track or tracks.

Figure 5:
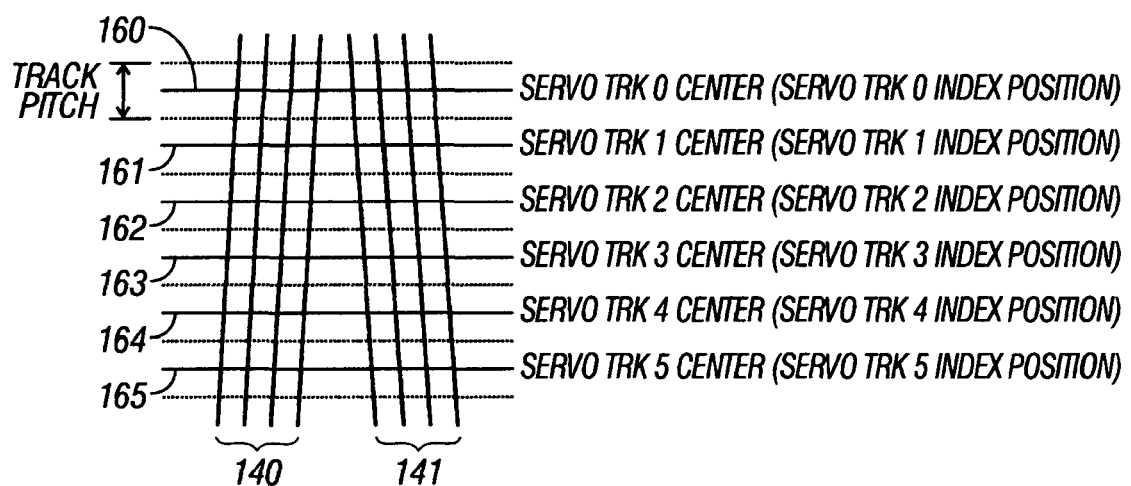
FIG. 5 is a schematic representation of a prior art servo band of the magnetic tape of FIG. 4 and index positions of a servo transducer as it tracks the servo band.

FIG. 5 illustrates one type of prior art servo band comprising a timing based servo pattern of the type described in U.S. Pat. No. 5,689,384, which comprises patterns of transitions recorded at more than one azimuthal orientation across the width of the servo band, and which are therefore non-parallel. The lateral position is determined as a ratio of two servo pattern intervals, one pattern interval employing parallel transitions such as two bursts 140 in separate patterns, and the other pattern interval employing transitions which are parallel to themselves, but not parallel to the first burst of transitions such as between burst 140 and burst 141. Each servo band may have a plurality of indexed defined servo positions, such as 6 separate indexed defined servo positions 160, 161, 162, 163, 164 and 165 for a single servo band. Alternative types of servo bands are known to those of skill in the art, and the present invention may be implemented as well with respect to other servo bands.

Referring to FIG. 4, the data read and/or write heads 117 are typically shared between various data tracks or groups of data tracks, and are moved between tracks or groups of tracks in the lateral direction of the tape. Each of the servo bands 111, 112, 113 and 114, provides the servo guidance for groups of data tracks, and the servo head 120, 121 of the tape head is repositioned laterally within a servo band at the various index positions to cause the data read and/or write heads 117 to access different data tracks, and is repositioned laterally to another servo band to access still further data tracks. In one example, the servo bands are spaced apart to span the data tracks, which are located between the servo bands. This places a servo band close to the corresponding data tracks to reduce the span between the outer read and/or write elements and the servo band, and reduce sensitivity to changes in tape width between the time data is written and read back. To insure that the servoing is precise, two servo transducers 120, 121 may be provided at either end of the tape head, straddling the data read and/or write heads. The lateral positioning may be obtained from either of the two servo bands, or by averaging or otherwise comparing data from the two servo bands.

Referring to FIGS. 1 and 4, in accordance with the present invention, the controller 18 may select a set of the write heads 117 and provide data from one or more selected separate data flow outputs 125, 126 of the buffer 30, for example, via a selected recording channels 132 and 133, to the selected set of write heads 117. The ability to select write heads is known in the art, employed, for example, if one set of write heads is used to write in one direction of tape motion, and a different set of write heads is used to write in the opposite direction. The same is true of read heads. In accordance with the present invention, however, separate sets of heads are selected to write data in the same direction, perhaps simultaneously. Alternatively, the recording channels 132 and 133 may comprise circuitry that is arranged to provide data to given write heads, and the recording channels are selected to thereby select the set of write heads 117.

This has the effect of writing different wraps of data at the same time. For example, if the number of write heads is doubled from that of the prior art tape drive, the write heads may be arranged so that two wraps may be written simultaneously by the write heads of the tape head. The same is true for read heads, necessary for read-while-write functionality. Those of skill in the art understand that the spacing of the heads 117 and the operation of the wrap control 27 may be arranged such that the wraps are compatible with the wraps of a tape head with fewer heads.

The buffer 30 may comprise a single buffer that has separate data flow outputs 125, 126, for example, that are time slice multiplexed, or which are separately accessed, and which address separate segments of the buffer. Alternatively, buffer 30 may comprise multiple buffers that are employed for different purposes.

Controller 18 may comprise at least one programmable computer processor operating under the control of program code. The programmable computer processor may comprise any processor or microprocessor device known in the art. The method of the present invention may be provided in the form of a computer program product usable with a programmable computer processor having computer readable program code embodied therein, and may be supplied to the programmable computer processor in any of various ways as are known to those of skill in the art. Alternatively, controller 18 may comprise discrete logic, ASIC (application specific integrated circuit), FPGA (field programmable gate array), etc.

Referring to FIGS. 1, 4, 6A, 6B and 7, in accordance with the present invention, the magnetic tape drive 10 is operated so as to cause one separate set of the write heads 117 to write data to magnetic tape 14, and, during the same operation, to cause another separate set of the write heads 117 to rewrite data to magnetic tape. The writing may be in parallel and may be simultaneous.

In this manner, data that is being supplied from a host system 20 and that is to be written to magnetic tape 14, is supplied, via interface 21 to buffer 30. If the data is indicated as being synchronized, such that it must be immediately written to tape from the buffer, and only after the synchronized transaction has been written to tape, can the host system overwrite the locally stored copy of the data, the synchronized transactions must be written immediately to magnetic tape 14 in separate bursts for each synchronization event.

In one embodiment of the present invention, controller 18 operates the buffer(s) 30 and the recording system 132, 133 to provide data from an output of the buffer to cause a separate set of the plurality of write heads to write the provided data to tracks of magnetic tape. Thus, the data is written to magnetic tape 14 immediately, and, if in the form of synchronized transactions, the data transactions are written to tracks of magnetic tape in a discontinuous manner from the buffer(s). In a further embodiment, the controller 18 additionally operates the recording system to cause the separate set of the plurality of write heads to write separator signals between the discontinuously written data transactions. In a further embodiment, the controller 18 additionally, for each synchronized data transaction, returns a command complete at interface 21 upon completion of the writing a synchronized transaction to tracks of magnetic tape in a discontinuous manner.

Figure 6A:
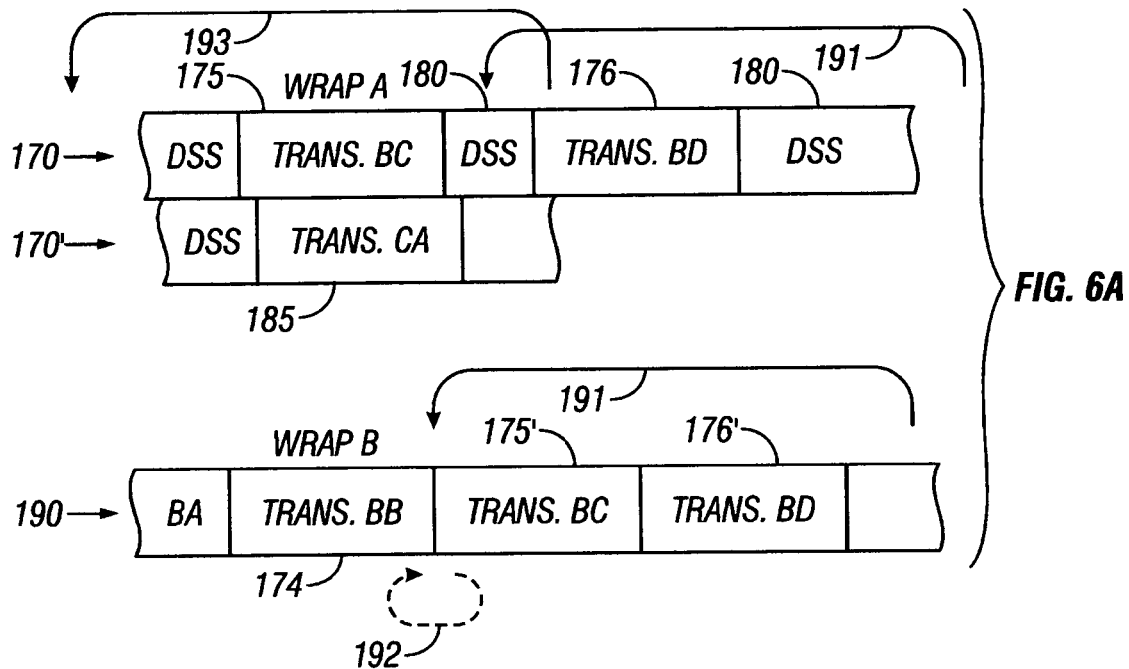
FIGS. 6A and 6B are diagrammatic illustrations of data written on magnetic tape in accordance with the present invention.

In the example of FIG. 6A, the magnetic tape drive writes the transactions to the magnetic tape on one of the wraps 170 without stopping. For example, transaction 175, provided from the buffer 30, is written to the magnetic tape; leaving an elongated gap, comprising an unrecorded gap and/or written separator signals 180 (e.g., DSS) following the written transaction record 175, continuing the gap with or without separator signals 180 until a subsequently received synchronized transaction 176 is written to the magnetic tape following the gap or separator signals. Thus, the data is written to magnetic tape 14 immediately, for example, in a "backhitchless flush", or "BF" type of operation.

The controller 18 saves the provided data at the buffer 30. In one example, the data remains in the buffer at the original location at which it was written, and the data at that address is protected from being overwritten by succeeding data. In another example, the data is moved to another address of the buffer which is designated for data that is saved and is not to be overwritten. In still another example, buffer 30 comprises multiple buffers, and the data, as it is written to magnetic tape, is also transferred from a first buffer to a second buffer for saved data.

Thus, as the data is supplied to the magnetic tape drive 10, it is written to magnetic tape, and is saved at the buffer 30.

During the same operation, the controller operates the buffer 30 and the recording system to provide saved data from the buffer 30 to cause another separate set of the plurality of write heads to rewrite the saved data to other tracks of the magnetic tape in a continuous arrangement. In the example of FIG. 6A, a transaction 174 that had been written to BF wrap 170 and saved, is written to a rewrite wrap 190. The transactions are rewritten without the extended gaps of the BF wrap, thereby saving time when the transactions are read. Thus, during the same operation, the separate sets of write heads, write data to magnetic tape, and rewrite saved data to the magnetic tape, perhaps simultaneously writing with the separate sets of write heads.

Since there is typically a wait between synchronized transactions from the host system 20 of FIG. 1, leading to the long gaps 180 between transactions, the buffer 30 empties more rapidly when rewriting data to the rewrite wrap, than new data is received from the host system.

The rewriting is therefore a subset of the time that BF writing is occurring. As the result, the rewriting may wait until enough data has been saved to begin rewriting. Even so, the buffer is likely to run out of data to rewrite. At this point, the rewriting stops. New data transactions may continue to be written to the BF wrap. Alternatively or additionally, a backhitch may occur to a previous position on the BF wrap, such that the new data transactions can overwrite BF data transactions that have been rewritten.

Once enough data to begin rewriting has been written to the BF wrap and has been saved, a backhitch or a forward movement may be conducted to the end of the previously rewritten transaction, and the next data that had been saved but not rewritten is rewritten to the rewrite wrap. The data transactions that had been written to the BF wrap and not rewritten cannot be overwritten unless temporarily written elsewhere, as will be discussed. Thus, if such data transactions are encountered, the BF writing must be stopped until the data transactions are rewritten.

In the example of FIG. 6A, the buffer runs out of data to rewrite upon rewriting data transaction 174. BF transaction 175 had been written to the BF wrap 170, and, while the system waits for more data to accumulate in the buffer to rewrite, for example, half of the buffer capacity, BF writing may continue, as discussed above, writing transaction 176 to the BF wrap. In one alternative, a backhitch 191 may occur after transactions 175 and 176, etc., are written to the BF wrap, and saved, and after enough data has been saved to begin rewriting. In backhitch 191, the tape is moved to the last rewritten transaction 174. However, BF writing must then be stopped, since transactions 175, 176, etc., of BF wrap 170 have not been rewritten, and are not overwritten. Alternatively, the transactions may be temporarily written elsewhere, allowing the initial copy to be overwritten, as will be discussed. Then, the saved transactions 175', 176', etc., are rewritten to the rewrite wrap 190, appended to transaction 174, and the appearance will be as though backhitch 192 had occurred for the rewrite wrap. Subsequent to rewriting the saved data transactions 175' and 176', etc., to the magnetic tape to a rewrite wrap 190, the data of the BF wrap 170 that had been saved and rewritten, may be overwritten, shown in the subsequent state as wrap 170'. Thus, after a backhitch, the writing of new data to the BF wrap 170' may resume, and the data is once again written to magnetic tape 14 immediately in the backhitchless flush type of operation. Alternatively, a backhitch 193 may occur when the buffer runs out of data to be rewritten, the backhitch to a previous position on the BF wrap 170', at a point where the data transactions have been rewritten, and the data may now be overwritten. BF writing may then continue, as discussed above, writing transactions, up to transaction 185 of the BF wrap. When enough data has been saved to begin rewriting, the tape is moved forward to the end of the last rewritten transaction 174. If a transaction 175, 176 of BF wrap 170 is encountered that has not been rewritten, the BF writing must be stopped, since transactions 175, 176, etc., have not been rewritten and are not overwritten. Alternatively, the transactions may have been temporarily rewritten elsewhere and thus may be overwritten. The tape is moved forward to the end of the last rewritten transaction 174. Then, the saved transactions 175', 176', etc., are rewritten to the rewrite wrap 190, appended to transaction 174, and the appearance will be as though backhitch 192 had occurred for the rewrite wrap. Subsequent to rewriting the saved data transactions 175' and 176', etc., to the magnetic tape to a rewrite wrap 190, the data of the BF wrap 170 that had been saved and rewritten, may be overwritten. The data saved in the buffer 30 of FIG. 1 may also be overwritten. Thus, the writing of new data to the BF wrap 170' may resume, and the data is once again written to magnetic tape 14 immediately in the backhitchless flush type of operation.

The performance of the arrangement of the embodiment of FIG. 6A is limited by the requirement to prevent overwriting data that has not yet been rewritten.

Figure 6B:
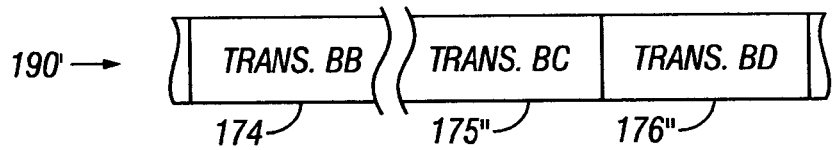

In one alternative, referring additionally to FIG. 6B, data saved as accumulated in buffer 30 of FIG. 1 and discontinuously written to wrap 170 of FIG. 6A, such as data transactions 175, 176, etc., are temporarily rewritten, potentially while the discontinuous writing of data transactions continues. In the example of FIG. 6B, data transactions 175" and 176" are temporarily rewritten at wrap 190', a distance from the location of finally rewritten data transaction 174. At an appropriate time, either by backhitch 191, or by writing discontinuous data transactions and/or temporarily rewritten transactions on another wrap in the reverse direction, the recording system finally rewrites data transaction 175', 176' on wrap 190, and is able to simultaneously begin writing new discontinuous data transactions on wrap 170, overwriting the original discontinuous data transactions 175 and 176.

Figure 7:
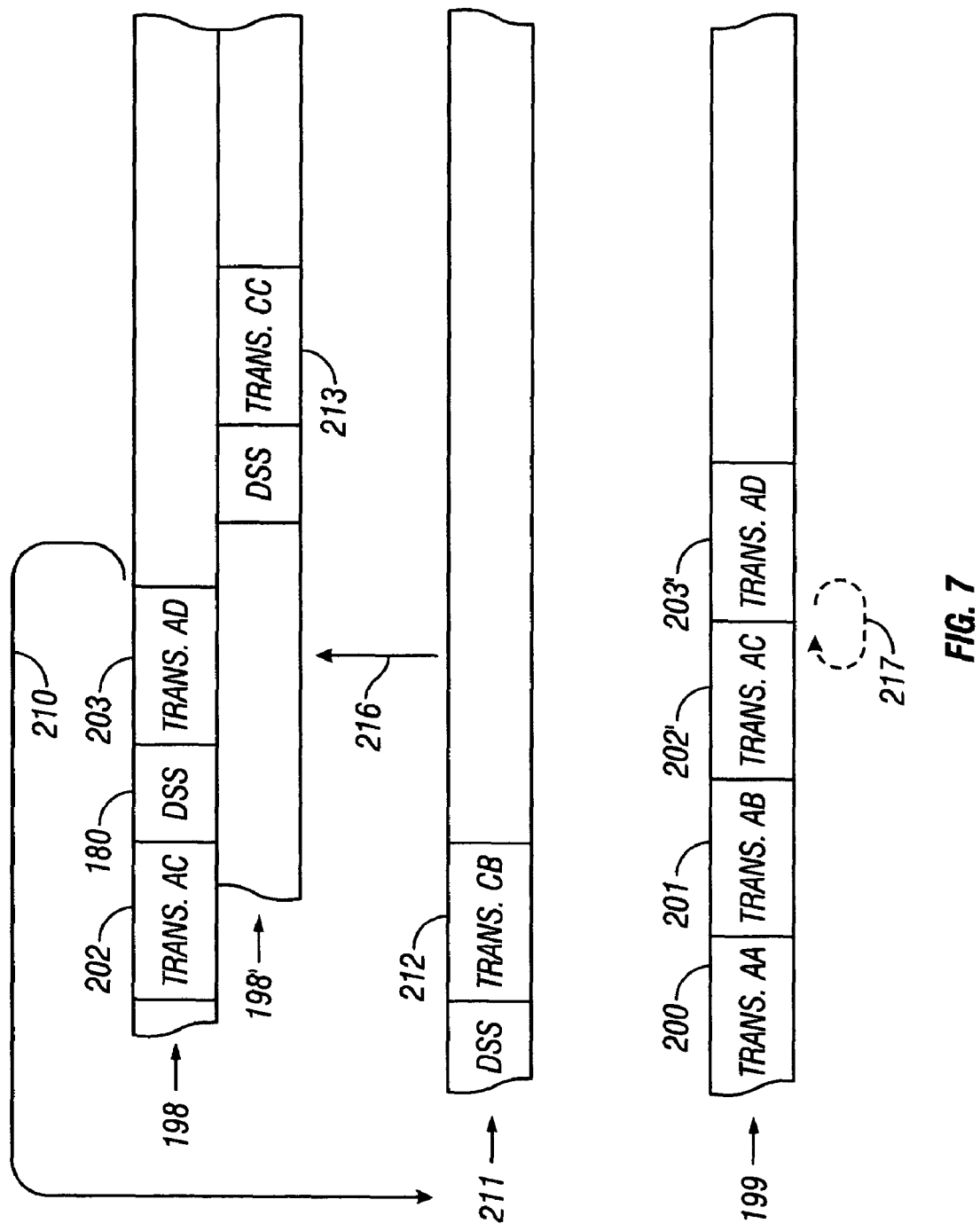
FIG. 7 is a diagrammatic illustration of an alternative arrangement of data written on magnetic tape in accordance with the present invention.

FIG. 7 illustrates an alternative arrangement, employing a seek to a different BF wrap, to avoid the necessity of waiting to overwrite data that has not been rewritten.

In the example of FIG. 7, data transactions are written to BF wrap 198, including transactions 202 and 203, and saved, and saved data transactions are written to rewrite wrap 199, including transactions 200, 201, and 202'. In the example, the buffer runs out of data upon rewriting data transaction 202'. A seek 210 is conducted to an alternate BF wrap 211. The seek may be direct, or may involve forward or backward motion of the tape.

The seek allows the writing of BF transactions to continue at alternate wrap 211, while the saved, but not rewritten, BF transaction 203 is maintained on wrap 198. As an example, BF transactions are written to alternate wrap 211, including transaction 212. When enough data has been saved to begin rewriting, a seek 216 is conducted back to the rewrite wrap 199, and the tape is moved to the end of the last rewritten transaction 202'. Then, the saved transactions, including transaction 203', are rewritten to the rewrite wrap 199, appended following transaction 202', and the appearance will be as though backhitch 217 had occurred for the rewrite wrap. The writing of new data to the BF wrap 198 may resume, shown in the subsequent state as BF wrap 198'. The resumed writing, in the example, begins with BF data transaction 213, and the data is once again written to magnetic tape 14 immediately in the backhitchless flush type of operation.

At the next instance of the buffer running out of data to be rewritten to the rewrite wrap, the tape may be moved, such as a backhitch to a previous position on the BF wrap 198' at a point where the data transactions have been rewritten, and the data may now be overwritten, up to a point where data transactions are encountered that have not been rewritten, and that cannot be overwritten. Alternatively, BF writing may continue forward at the BF wrap 198', as discussed above with respect to FIGS. 6A and 6B, writing transactions, up to the end of tape for that wrap, or until data transactions are encountered that have not been rewritten, and that cannot be overwritten. Still alternatively, a seek may again occur to the alternate BF wrap 211 of FIG. 7, again up to the end of tape for that wrap or data transactions are encountered that have not been rewritten, and that cannot be overwritten.

Thus, although not necessary, the performance improves with one seek 210 to another track, allowing BF writing to occur back to the longitudinal position where the rewriting ended. The seek allows the BF writing to resume immediately on the alternate wrap 211. The seek back 216 allows the rewriting to continue on the original rewrite wrap 199, and allows the BF writing to again resume immediately back on the first wrap 198'.

Alternatively, BF writing may continue on BF wrap 198, and saved accumulated data transactions may be temporarily rewritten subsequently on wrap 199, or rewritten subsequently on a wrap related to wrap 211. Then, the original discontinuous data transactions may immediately be overwritten with the final rewriting of data transactions 202', 203', etc.

The BF wraps and rewrite wraps may be provided in alternative arrangements. In the example of FIGS. 8A and 8B, the BF wraps are allocated, as are the rewrite wraps. Thus, the data is from the buffer 30 of FIG. 1 to one of the wraps in a sequence of the wraps, and the saved data is rewritten to another of the wraps that is offset from the one of the wraps.

FIG. 8A represents a "pass 1" of rewriting saved data to a rewrite wrap 240. Wraps 241, 242 and 243 represent other rewrite wraps. During the same operation, the received data is written to BF write wrap 245. Wraps 246, 247 and 248 represent other BF write wraps which are offset from the rewrite wraps such that the separate sets of the tape write heads may simultaneously write at a BF write wrap and a rewrite wrap. If an alternate BF wrap is employed as discussed above, it will comprise one of the BF wraps 245, 246, 247 and 248. In the example of the "pass 1", BF write wrap 246 is the alternate BF wrap.

FIG. 8B represents a "pass 2" of rewriting saved data to the rewrite wraps, illustrating rewrite wrap 241. Wrap 240 in the example has already been rewritten with saved data. During the same operation, the received data is written to BF write wrap 246, which is offset from the rewrite wrap 241 such that the separate sets of the tape write heads may simultaneously write at a BF write wrap 246 and the rewrite wrap 241. If an alternate BF wrap is employed as discussed above, it will comprise one of the BF wraps 245, 246, 247 and 248. In the example of the "pass 2", BF write wraps 247 or 248 may be the alternate BF wrap.

The wrap offset is such that separate BF wraps and rewrite wraps are available at the tape write head offset for the separate sets of tape write heads, and may comprise the index positions of FIG. 5, where, at each index position, the separate sets of write heads write the two wraps, or comprises other suitable offset arrangements. Referring to FIGS. 4 and 5, in the arrangement of FIG. 5, alternate write heads 117 may be selected for the two wraps, or write heads 117 at opposite ends of the tape head 23 may be selected for the two wraps. Other arrangements, such as selecting adjacent pairs of heads for each wrap, may alternatively be employed.

In a further embodiment, the controller 18 of FIG. 1 selectively operates the buffer 30 and the recording system to provide data from the buffer to cause a separate set of the plurality of write heads 117 of FIG. 4 to write the provided data to tracks of magnetic tape, saving the provided data; and, during the same operation, operates the buffer 30 of FIG. 1 and the recording system to provide saved data from the buffer to cause another separate set of the plurality of write heads to write the saved and provided data to other tracks of the magnetic tape, for example, as illustrated by FIG. 6, FIG. 7, or FIG. 8; and, selectively operates the buffer 30 of FIG. 1 and the recording system to provide data from the buffer to cause the plurality of write heads 117 of FIG. 4 to write provided data to tracks of magnetic tape, comprising up to all sets of the write heads, as illustrated by "full head" data of FIG. 9, with the pattern of write heads similar to that illustrated in FIG. 8. Thus, if there is no synchronized data or no need to write data to magnetic tape, save the data and subsequently rewrite the data to the tape, then all the heads may selectively be employed to write in parallel, e.g. to wraps 250 and 251 of FIG. 9. If the data comprises a pattern of synchronized data, the controller selectively writes the data to a BF wrap 245 of FIG. 8, and rewrites saved data to rewrite wrap 240. The selectivity may occur on the basis of patterns of data transactions, or, more likely, on the basis of the data that will be provided to the tape cartridge. Thus, the host system or operator may indicate that the data for the magnetic tape cartridge 11 of FIG. 1 will be synchronized data, or will not be synchronized data, and the controller 18 selects the write heads to write the pattern of FIG. 8A or of FIG. 9, accordingly.

In a still further embodiment, wherein the magnetic tape drive additionally comprises a plurality of read heads 117 in FIG. 4 for reading from magnetic tape while the magnetic tape is moved longitudinally with respect to the plurality of read heads, the controller additionally selectively operates the read data system 134 of FIG. 1 to read one of the wraps at a time with one set of the plurality of read heads, when the data is written as rewritten data, for example, as illustrated in the pattern of FIG. 8A and FIG. 8B; and selectively operates the read data system to read a plurality of the wraps at a time with the plurality of read heads when the data is written as full write data, for example, as illustrated in the pattern of FIG. 9. The indication whether the data is in the form of full write data or in the form of rewritten data may be in the index or similar information at the beginning of the tape.

FIGS. 10A and 10B illustrate an alternative arrangement of the use of the wraps for writing data, and rewriting saved data. In a still further embodiment, the wraps are accessed in a sequence, such that a wrap having the data to be saved follows in the sequence a wrap at which the data is rewritten, such that a continuous string of wraps are first written as BF wraps with the data to be saved, and then are overwritten with the rewritten data.

FIG. 10A represents a "pass 1" of rewriting saved data to a rewrite wrap 270. Wrap 271 comprises a BF wrap to which the received data is written, during the same operation. In the example of the "pass 1", wrap 272 is the alternate BF wrap.

FIG. 10B represents a "pass 2" of rewriting saved data to the rewrite wraps, illustrating the overwriting of former BF wrap 271 as rewrite wrap 271'. Wrap 272' in the example now becomes the BF write wrap. If an alternate BF wrap is employed as discussed above, it will comprise one of the remaining previously unwritten wraps, such as wraps 273. Thus, the wrap having the data to be saved 272' is next in the sequence from a wrap 271' at which the data is rewritten, such that a continuous string of wraps are first written as BF wraps with the data to be saved, and then are overwritten with the rewritten data.

The controller 18 of FIG. 1 additionally operates the plurality of read heads 117 of FIG. 4 and the read data system 134 of FIG. 1 to read one of the wraps 270', 271' of FIG. 10B at a time with one set of the read heads.

Figure 11:
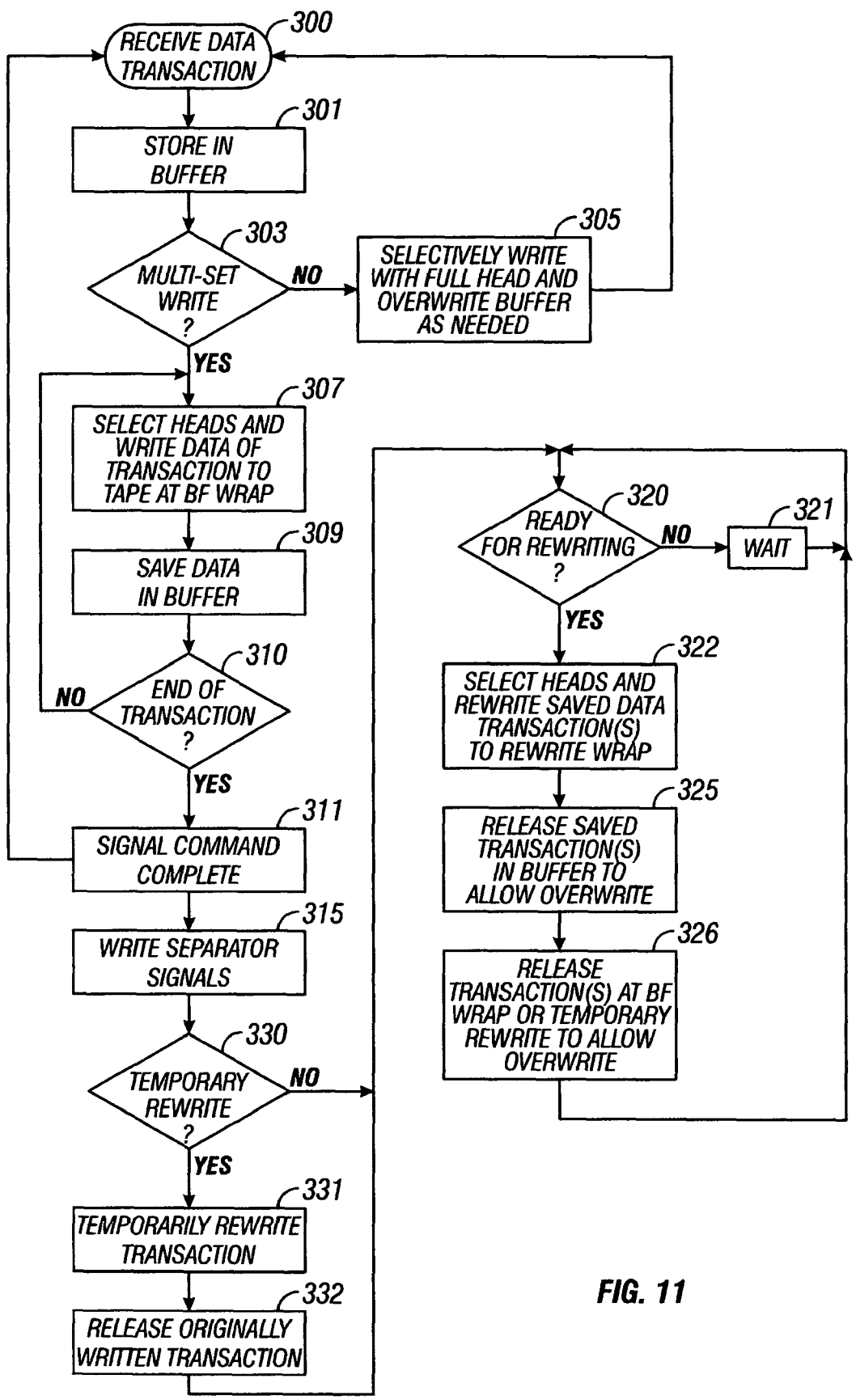
FIG. 11 is a flow chart depicting embodiments of the present invention.

FIG. 11 comprises a flow chart of an embodiment of the computer implemented method of the present invention. Data is received at step 300, and stored in the buffer(s) in step 301, such that the data may be written to tape. In step 303, the controller determines whether the write operation will be a multi-set write, using sets of write heads, or a full head write. If it is a full head write, as discussed above, in step 305, the controller selects the full head write, operating the buffer 30 of FIG. 1 and the recording system to provide data from the buffer to cause the plurality of write heads 117 of FIG. 4 to write provided data to tracks of magnetic tape, comprising up to all sets of the write heads, as illustrated by "full head" data of FIG. 9.

If step 303 indicates a multi-set write, such as for synchronized transactions, in step 307, the controller 18 of FIG. 1 selectively operates the buffer 30 and the recording system to provide data from the buffer to cause a separate set of the plurality of write heads 117 of FIG. 4 to write the provided data to tracks of magnetic tape. In step 309 of FIG. 11, the controller saves the provided data, the operation continuing for the transaction until the full transaction has been both written to magnetic tape and saved, as indicated by step 310. After the transaction is both written to magnetic tape and saved, in step 311, the controller 18 of FIG. 1, additionally, for the synchronized data transaction, returns a command complete at interface 21 upon completion of the writing a synchronized transaction to tracks of magnetic tape in a discontinuous manner. In step 315 of FIG. 11, the controller leaves an elongated gap, comprising an unrecorded gap and/or written separator signals to the magnetic tape following the written synchronized transaction, continuing the gap with or without separator signals until a subsequently received synchronized transaction is written to the magnetic tape following the separator signals or gap. During the same operation, the controller operates the buffer 30 of FIG. 1 and the recording system to provide saved data from the buffer to cause another separate set of the plurality of write heads to write the saved and provided data to other tracks of the magnetic tape. Thus, in step 320 of FIG. 11, the controller determines whether enough data has been saved to warrant beginning the string of continuous rewritten transactions, by providing and rewriting the saved data. If not, step 321 indicates a wait for at least one additional transaction to be saved, and the determination is repeated. In this example, the determination is made as based on a threshold, for example, of the number of transactions or the amount of data or percentage of buffer capacity, that has been saved. Alternatively, a count may be maintained, and a counter may indicate when it reaches its full count.

When the controller is ready for rewriting in step 320, the controller, in step 322, selects the set of write heads and provides data from one or more selected separate data flow outputs 125, 126 of the buffer 30, of FIG. 1, for example, via a selected recording channels 132 and 133, to the selected set of write heads 117 to rewrite the saved data at a rewrite wrap. Then, in step 325 of FIG. 11, the controller releases the saved transaction in the buffer to allow overwrite of the data by new data transactions to be saved. Further, in step 326, the controller releases the same transaction at the BF wrap to allow overwrite of the data by new data transactions to be written to the tape. The process returns to step 320 to determine if the process is still ready for rewriting, or whether, for example, the buffer has run out of data to be rewritten. Step 320 also is the point at which the determination is made to move the tape to another position on the BF wrap and/or seek to an alternate BF wrap and to continue to save data to be rewritten, as discussed above.

Step 330 provides the option of temporarily rewriting data that had been originally discontinuously written and also saved in the buffer. Since the data is recorded on tape elsewhere, the original discontinuously written data may be overwritten. Thus, when data is being rewritten on the alternate track, new data may be discontinuously written at the same time, overwriting the original discontinuously written data.

Thus, step 331 comprises temporarily rewriting the data transaction. A transaction is selected for temporary rewriting based on its position laterally offset with respect to the location for rewriting transactions that are to be finally rewritten. When the data has been temporarily rewritten, step 332 releases the original discontinuously written transaction so that it may be overwritten.

The temporarily rewritten data transaction is ultimately released in step 326 after the saved data transaction has been finally rewritten to a rewrite wrap in step 322.

The illustrated components of the magnetic tape drive and recording system of FIG. 1, and the arrangement of the tape head of FIG. 4 may be varied, combined, or combined functions may be separated, as is known to those of skill in the art. The illustrated steps of FIG. 11 may be altered in sequence, omitted, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

I claim:

1. A recording system for a magnetic tape drive, said magnetic tape drive having a plurality of write heads for writing to magnetic tape while said magnetic tape is moved longitudinally with respect to said plurality of write heads, said recording system comprising:

at least one buffer storing data to be written to magnetic tape, said at least one buffer having a plurality of separate data flow outputs;

a plurality of recording channels receiving output data flow from said plurality of separate data flow outputs, and for operating separate sets of said plurality of write heads to write data to magnetic tape; and a controller operating said at least one buffer and said plurality of recording channels, said controller:

operating said at least one buffer and one of said plurality of recording channels to provide data from said at least one buffer to cause a separate set of said plurality of write heads to write said provided data to tracks of magnetic tape;

saving said provided data at said at least one buffer; and during the same operation, operating said at least one buffer and another of said plurality of recording channels to provide saved said data from said at least one buffer to cause another separate set of said plurality of write heads to rewrite said saved data to other tracks of said magnetic tape in a continuous arrangement, whereby said separate sets of said plurality of write heads, write said data to magnetic tape, and rewrite said saved data to said magnetic tape, during the same operation, said rewritten data comprising a continuous arrangement of said data;

wherein said data stored in said buffer is in the form of data transactions; and wherein said controller additionally responds to an indication that said stored data transactions are to be written to magnetic tape as synchronized data transactions; operating said at least one buffer and one of said recording channels to cause a separate set of said plurality of write heads to write said stored data transactions from said buffer to tracks of magnetic tape in a discontinuous manner, and saving said provided data transactions at said at least one buffer; and, during the same operation, operating said at least one buffer and another of said plurality of recording channels to cause another separate set of said plurality of write heads to rewrite saved said data transactions to other tracks of said magnetic tape in a continuous arrangement.

2. The recording system of claim 1, wherein said controller additionally operates said one recording channel to cause said separate set of said plurality of write heads to write separator signals between said discontinuously written data transactions.

3. The recording system of claim 1, additionally comprising an interface for receiving said data transactions and storing said received transactions to said at least one buffer, and wherein said controller additionally, for each received said synchronized data transaction, returns a command complete at said interface upon completion of said writing said received synchronized data transaction to tracks of magnetic tape in a discontinuous manner.

4. A recording system for a magnetic tape drive, said magnetic tape drive having a plurality of write heads for writing to magnetic tape while said magnetic tape is moved longitudinally with respect to said plurality of write heads, said recording system comprising:

at least one buffer storing data to be written to magnetic tape, said at least one buffer having a plurality of separate data flow outputs;

a plurality of recording channels receiving output data flow from said plurality of separate data flow outputs, and for operating separate sets of said plurality of write heads to write data to magnetic tape; and a controller operating said at least one buffer and said plurality of recording channels, said controller:

operating said at least one buffer and one of said plurality of recording channels to provide data from said at least one buffer to cause a separate set of said plurality of write heads to write said provided data to tracks of magnetic tape;

saving said provided data at said at least one buffer; and during the same operation, operating said at least one buffer and another of said plurality of recording channels to provide saved said data from said at least one buffer to cause another separate set of said plurality of write heads to rewrite said saved data to other tracks of said magnetic tape in a continuous arrangement, whereby said separate sets of said plurality of write heads, write said data to magnetic tape, and rewrite said saved data to said magnetic tape, during the same operation, said rewritten data comprising a continuous arrangement of said data;

wherein said magnetic tape drive additionally comprises a wrap control for translating said plurality of write heads laterally to different sets of wraps of said tracks of magnetic tape, such that either of said sets of write heads may write data to at least some of said wraps; and wherein said controller operates said wrap control, said at least one buffer and said plurality of recording channels to write said provided data from said at least one buffer to one of said wraps, said data to be saved, and to rewrite saved said data on another of said wraps; and to seek to an alternate of said wraps to continue to write said provided data to be saved, and to seek back to said one of said wraps and said another of said wraps.

5. A magnetic tape drive, comprising:

a drive system for moving a magnetic tape longitudinally;

a plurality of write heads for writing to said magnetic tape while said magnetic tape is moved longitudinally by said drive system;

an interface for receiving data to be written to said magnetic tape;

at least one buffer storing data received at said interface, said at least one buffer having a plurality of separate data flow outputs;

a recording system receiving output data flow from said plurality of separate data flow outputs, and for operating separate sets of said plurality of write heads to write data to magnetic tape; and a controller operating said at least one buffer and said recording system, said controller:

operating said at least one buffer and one of said recording system to provide data from said at least one buffer to cause a separate set of said plurality of write heads to write said provided data from said at least one buffer to tracks of magnetic tape;

saving said provided data at said at least one buffer; and during the same operation, operating said at least one buffer and another of said recording system to provide saved said data from said at least one buffer to cause another separate set of said plurality of write heads to rewrite said saved data to other tracks of said magnetic tape in a continuous arrangement, whereby said separate sets of said plurality of write heads, write said data to magnetic tape, and rewrite said saved data to said magnetic tape, during the same operation, said rewritten data comprising a continuous arrangement of said data;

wherein said data to be written to magnetic tape is in the form of data transactions; and wherein said controller additionally responds to an indication that said stored data transactions are to be written to magnetic tape as synchronized data transactions; operating said at least one buffer and said recording system to cause a separate set of said plurality of write heads to write said stored data transactions from said at least one buffer to tracks of magnetic tape in a discontinuous manner, and saving said provided data transactions at said at least one buffer; and, during the same operation, operating said at least one buffer and said recording system to cause another separate set of said plurality of write heads to rewrite saved said data transactions to other tracks of said magnetic tape in a continuous arrangement.

6. The magnetic tape drive of claim 5, wherein said controller additionally operates said recording system to cause said separate set of said plurality of write heads to write separator signals between said discontinuously written data transactions.

7. The magnetic tape drive of claim 5, wherein said controller additionally, for each said synchronized data transaction, returns a command complete at said interface upon completion of said writing said synchronized transaction to tracks of magnetic tape in a discontinuous manner.

8. A magnetic tape drive, comprising:
a drive system for moving a magnetic tape longitudinally;
a plurality of write heads for writing to said magnetic tape while said magnetic tape is moved longitudinally by said drive system;
an interface for receiving data to be written to said magnetic tape;
at least one buffer storing data received at said interface, said at least one buffer having a plurality of separate data flow outputs;
a recording system receiving output data flow from said plurality of separate data flow outputs, and for operating separate sets of said plurality of write heads to write data to magnetic tape; and
a controller operating said at least one buffer and said recording system, said controller:
operating said at least one buffer and one of said recording system to provide data from said at least one buffer to cause a separate set of said plurality of write heads to write said provided data from said at least one buffer to tracks of magnetic tape;
saving said provided data at said at least one buffer; and
during the same operation, operating said at least one buffer and another of said recording system to provide saved said data from said at least one buffer to cause another separate set of said plurality of write heads to rewrite said saved data to other tracks of said magnetic tape in a continuous arrangement, whereby said separate sets of said plurality of write heads, write said data to magnetic tape, and rewrite said saved data to said magnetic tape, during the same operation, said rewritten data comprising a continuous arrangement of said data;
additionally comprising a wrap control for translating said plurality of write heads laterally to different sets of wraps of said tracks of magnetic tape, such that either of said sets of write heads may write data to at least some of said wraps; and wherein said controller operates said wrap control, said at least one buffer and said recording system to write provided data from said at least one buffer to one of said wraps, said data to be saved, and to rewrite saved said data on another of said wraps; and to seek to an alternate of said wraps to continue to write said provided data to be saved, and to seek back to said one of said wraps and said another of said wraps.

9. A method for writing data to magnetic tape, for a magnetic tape drive, said magnetic tape drive having a plurality of write heads for writing to magnetic tape while said magnetic tape is moved longitudinally with respect to said plurality of write heads, said method comprising the steps of:

buffering data to be written to magnetic tape;
providing said buffered data to cause a separate set of said plurality of write heads to write said provided data from said at least one buffer to tracks of magnetic tape;
saving said provided data; and
during the same operation, providing saved said data to cause another separate set of said plurality of write heads to rewrite said saved data to other tracks of said magnetic tape in a continuous arrangement, whereby said separate sets of said plurality of write heads, write said data to magnetic tape, and rewrite said saved data to said magnetic tape, during the same operation, said rewritten data comprising a continuous arrangement of said data;
wherein said data to be written to magnetic tape is in the form of data transactions; and wherein said method additionally comprises:
responding to an indication that said data transactions are to be written to magnetic tape as synchronized data transactions;
providing said synchronized data transactions from said at least one buffer to cause a separate set of said plurality of write heads to write said synchronized data transactions to tracks of magnetic tape in a discontinuous manner;
saving said provided synchronized data transactions; and
during the same operation, providing saved said synchronized data transactions to cause another separate set of said plurality of write heads to rewrite saved said synchronized data transactions to other tracks of said magnetic tape in a continuous arrangement.

10. The method of claim 9, wherein said step of providing said synchronized data transactions to cause said separate set of said plurality of write heads to write said synchronized data transactions to tracks of magnetic tape in a discontinuous manner, additionally comprises causing said separate set of said plurality of write heads to write separator signals between said discontinuously written data transactions.

11. The method of claim 9, additionally comprising the step of, for each said synchronized data transaction, returning a command complete upon completion of said writing said synchronized transaction to tracks of magnetic tape in a discontinuous manner.

12. A method for writing data to magnetic tape, for a magnetic tape drive, said magnetic tape drive having a plurality of write heads for writing to magnetic tape while said magnetic tape is moved longitudinally with respect to said plurality of write heads, said method comprising the steps of:

buffering data to be written to magnetic tape;
providing said buffered data to cause a separate set of said plurality of write heads to write said provided data from said at least one buffer to tracks of magnetic tape;
saving said provided data; and
during the same operation, providing saved said data to cause another separate set of said plurality of write heads to rewrite said saved data to other tracks of said magnetic tape in a continuous arrangement, whereby said separate sets of said plurality of write heads, write said data to magnetic tape, and rewrite said saved data to said magnetic tape, during the same operation, said rewritten data comprising a continuous arrangement of said data;
wherein said magnetic tape drive additionally accesses said plurality of write heads to different sets of wraps of said tracks of magnetic tape, such that either of said sets of write heads may write data to at least some of said wraps;

wherein said step of providing said buffered data to cause a separate set of said plurality of write heads to write said provided data from said at least one buffer to tracks of magnetic tape, additionally comprises writing said provided data to one of said wraps, said data to be saved;

wherein said step of, during the same operation, providing saved said data transactions to cause another separate set of said plurality of write heads to rewrite saved said data transactions to other tracks of said magnetic tape, additionally comprises rewriting saved said data to said magnetic tape to another of said wraps; and additionally comprising the steps of:
  seeking to an alternate of said wraps to continue to write said provided data to be saved; and
  seeking back to said one of said wraps and said another of said wraps.

13. A computer product embodied on a computer readable medium usable with at least one programmable computer processor having computer readable code embodied therein, said at least one programmable computer processor for operating a recording system for a magnetic tape drive; said magnetic tape drive having a plurality of write heads for writing to magnetic tape while said magnetic tape is moved longitudinally with respect to said plurality of write heads; said recording system comprising at least one buffer storing data to be written to magnetic tape, said at least one buffer having a plurality of separate data flow outputs; and said recording system for operating separate sets of said plurality of write heads to write data from said plurality of data flow outputs to magnetic tape; said computer program product comprising:

computer readable program code causing said at least one programmable computer processor to operate said at least one buffer and said recording system to provide data from said at least one buffer to cause a separate set of said plurality of write heads to write said provided data from said at least one buffer to tracks of magnetic tape;

computer readable program code causing said at least one programmable computer processor to save said provided data at said at least one buffer; and computer readable program code causing said at least one programmable computer processor to, during the same operation, operate said at least one buffer and said recording system to provide saved said data from said at least one buffer to cause another separate set of said plurality of write heads to rewrite said saved data to other tracks of said magnetic tape in a continuous arrangement, whereby said separate sets of said plurality of write heads, write said data to magnetic tape, and rewrite said saved data to said magnetic tape, during the same operation, said rewritten data comprising a continuous arrangement of said data;

wherein said data to be written to magnetic tape is in the form of data transactions; and said computer program product additionally comprises:

computer readable program code causing said at least one programmable computer processor to respond to an indication that said data transactions are to be written to magnetic tape as synchronized data transactions; operating said at least one buffer and said recording system to cause a separate set of said plurality of write heads to write said synchronized data transactions from said at least one buffer to tracks of magnetic tape in a discontinuous manner, and saving said provided data transactions at said at least one buffer; and, during the same operation, operating said at least one buffer and said recording system to cause another separate set of said plurality of write heads to rewrite saved said data transactions to other tracks of said magnetic tape in a continuous arrangement.

14. The computer program product of claim 13, additionally comprising computer readable program code causing said at least one programmable computer processor to operate said recording system to cause said separate set of said plurality of write heads to write separator signals between said discontinuously written data transactions.

15. The computer program product of claim 13, wherein said magnetic tape drive additionally comprises an interface; said computer program product additionally comprising computer readable program code causing said at least one programmable computer processor to, for each said synchronized data transaction, return a command complete at said interface upon completion of said writing said synchronized transaction to tracks of magnetic tape in a discontinuous manner.

16. A computer product embodied on a computer readable medium usable with at least one programmable computer processor having computer readable code embodied therein, said at least one programmable computer processor for operating a recording system for a magnetic tape drive; said magnetic tape drive having a plurality of write heads for writing to magnetic tape while said magnetic tape is moved longitudinally with respect to said plurality of write heads; said recording system comprising at least one buffer storing data to be written to magnetic tape, said at least one buffer having a plurality of separate data flow outputs; and said recording system for operating separate sets of said plurality of write heads to write data from said plurality of data flow outputs to magnetic tape; said computer program product comprising:

computer readable program code causing said at least one programmable computer processor to operate said at least one buffer and said recording system to provide data from said at least one buffer to cause a separate set of said plurality of write heads to write said provided data from said at least one buffer to tracks of magnetic tape;

computer readable program code causing said at least one programmable computer processor to save said provided data at said at least one buffer; and computer readable program code causing said at least one programmable computer processor to, during the same operation, operate said at least one buffer and said recording system to provide saved said data from said at least one buffer to cause another separate set of said plurality of write heads to rewrite said saved data to other tracks of said magnetic tape in a continuous arrangement, whereby said separate sets of said plurality of write heads, write said data to magnetic tape, and rewrite said saved data to said magnetic tape, during the same operation, said rewritten data comprising a continuous arrangement of said data;

wherein said magnetic tape drive comprises a wrap control for translating said plurality of write heads laterally to different sets of wraps of said tracks of magnetic tape, such that either of said sets of write heads may write data to at least some of said wraps; and said computer program product additionally comprises:

computer readable program code causing said at least one programmable computer processor to operate said wrap control, said at least one buffer and said recording system to write provided data from said at least one buffer to one of said wraps, said data to be saved, and to rewrite saved said data on another of said wraps; and computer readable program code causing said at least one programmable computer processor to operate said wrap control, said at least one buffer and said recording system to seek to an alternate of said wraps to continue to write said provided data to be saved, and to seek back to said one of said wraps and said another of said wraps.

17. Control logic for a magnetic tape drive, said magnetic tape drive having a plurality of write heads for writing to magnetic tape while said magnetic tape is moved longitudinally with respect to said plurality of write heads; at least one buffer storing data to be written to magnetic tape, said at least one buffer having a plurality of separate data flow outputs; and a recording system for operating separate sets of said plurality of write heads to write data from said plurality of separate data flow outputs to magnetic tape; said control logic:

operating said at least one buffer and said recording system to provide data from said at least one buffer to cause a separate set of said plurality of write heads to write said provided data from said at least one buffer to tracks of magnetic tape;

saving said provided data at said at least one buffer; and during the same operation, operating said at least one buffer and said recording system to provide saved said data from said at least one buffer to cause another separate set of said plurality of write heads to rewrite said saved data to other tracks of said magnetic tape in a continuous arrangement, whereby said separate sets of said plurality of write heads, write said data to magnetic tape, and rewrite said saved data to said magnetic tape, during the same operation, said rewritten data comprising a continuous arrangement of said data;

wherein said data to be written to said magnetic tape is in the form of data transactions; and wherein said control logic additionally responds to an indication that said data transactions are to be written to magnetic tape as synchronized data transactions; operating said at least one buffer and said recording system to cause a separate set of said plurality of write heads to write said provided synchronized data transactions to tracks of magnetic tape in a discontinuous manner, and saving said provided synchronized data transactions at said at least one buffer; and, during the same operation, operating said at least one buffer and said recording system to cause another separate set of said plurality of write heads to rewrite saved said synchronized data transactions to other tracks of said magnetic tape in a continuous arrangement.

18. The control logic of claim 17, wherein said control logic additionally operates said recording system to cause said separate set of said plurality of write heads to write separator signals between said discontinuously written data transactions.

19. The control logic of claim 17, said magnetic tape drive additionally comprises an interface, and wherein said control logic additionally, for each said synchronized data transaction, returns a command complete at said interface upon completion of said writing said synchronized transaction to tracks of magnetic tape in a discontinuous manner.

20. Control logic for a magnetic tape drive, said magnetic tape drive having a plurality of write heads for writing to magnetic tape while said magnetic tape is moved longitudinally with respect to said plurality of write heads; at least one buffer storing data to be written to magnetic tape, said at least one buffer having a plurality of separate data flow outputs; and a recording system for operating separate sets of said plurality of write heads to write data from said plurality of separate data flow outputs to magnetic tape; said control logic:

operating said at least one buffer and said recording system to provide data from said at least one buffer to cause a separate set of said plurality of write heads to write said provided data from said at least one buffer to tracks of magnetic tape;

saving said provided data at said at least one buffer; and during the same operation, operating said at least one buffer and said recording system to provide saved said data from said at least one buffer to cause another separate set of said plurality of write heads to rewrite said saved data to other tracks of said magnetic tape in a continuous arrangement, whereby said separate sets of said plurality of write heads, write said data to magnetic tape, and rewrite said saved data to said magnetic tape, during the same operation, said rewritten data comprising a continuous arrangement of said data;

wherein said magnetic tape drive additionally comprises a wrap control for translating said plurality of write heads laterally to different sets of wraps of said tracks of magnetic tape, such that either of said sets of write heads may write data to at least some of said wraps; and wherein said control logic operates said wrap control, said at least one buffer and said recording system to write provided data from said at least one buffer to one of said wraps, said data to be saved, and to rewrite saved said data on another of said wraps; and to seek to an alternate of said wraps to continue to write said provided data to be saved, and to seek back to said one of said wraps and said another of said wraps.

* * * * *